(12) United States Patent
Hart et al.

(10) Patent No.: US 11,994,590 B2
(45) Date of Patent: May 28, 2024

(54) HIGH DYNAMIC RANGE LIDAR

(71) Applicant: GM GLOBAL TECHNOLOGY OPERATIONS LLC, Detroit, MI (US)

(72) Inventors: Nathaniel W. Hart, Beverly Hills, MI (US); Adam L. Wright, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 832 days.

(21) Appl. No.: 16/598,020

(22) Filed: Oct. 10, 2019

(65) Prior Publication Data

US 2021/0109225 A1  Apr. 15, 2021

(51) Int. Cl.
| | | |
|---|---|---|
| *G01S 17/89* | (2020.01) | |
| *G01S 7/486* | (2020.01) | |
| *G01S 7/4863* | (2020.01) | |
| *G01S 7/487* | (2006.01) | |
| *G01S 17/93* | (2020.01) | |

(52) U.S. Cl.
CPC ............ *G01S 17/93* (2013.01); *G01S 7/4863* (2013.01); *G01S 7/4868* (2013.01); *G01S 7/487* (2013.01); *G01S 17/89* (2013.01)

(58) Field of Classification Search
CPC ...................................................... G01A 17/93
See application file for complete search history.

(56) References Cited

U.S. PATENT DOCUMENTS

| | | | |
|---|---|---|---|
| 10,254,388 B2* | 4/2019 | LaChapelle | G01S 7/497 |
| 10,551,501 B1* | 2/2020 | LaChapelle | G01S 7/4818 |
| 11,289,873 B2* | 3/2022 | Zhang | H01S 3/2308 |
| 11,300,683 B2* | 4/2022 | Bao | G01S 17/26 |
| 11,698,641 B2* | 7/2023 | Hufnagel | G01S 7/4817 |
| | | | 701/24 |
| 2018/0284237 A1* | 10/2018 | Campbell | G01S 17/931 |
| 2018/0284286 A1* | 10/2018 | Eichenholz | G01S 17/89 |
| 2019/0056504 A1* | 2/2019 | Hartman | G01S 17/89 |
| 2019/0310372 A1* | 10/2019 | Crouch | G01S 17/26 |

* cited by examiner

*Primary Examiner* — Irfan Habib
(74) *Attorney, Agent, or Firm* — Lorenz & Kopf LLP

(57) ABSTRACT

Systems and method are provided for controlling a vehicle. In one embodiment, a method includes: receiving, by the controller, first return data detected by a first detector of a lidar device as a result of a first laser pulse or chirp; receiving, by the controller, second return data detected by a second detector of the lidar device as a result of a second laser pulse or chirp; combining, by the controller, the first return data and the second return data to form a point cloud; and controlling, by the controller, the vehicle based on the point cloud.

18 Claims, 6 Drawing Sheets

HIGH DYNAMIC RANGE LIDAR

TECHNICAL FIELD

The present disclosure generally relates to lidar systems, and more particularly relates to systems and methods for increasing a distance measurement dynamic range of a lidar systems of a vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, sensor systems can be characterized based on their different operating distance ranges. Lidar systems provide greater accuracy at greater distances than other sensor systems. However, long-range lidars are more sensitive to elements near the vehicle such as dust, fog, exhaust, etc. due to their increase sensitivity and laser power. Thus, the short-range accuracy of a long-range lidar is compromised for long range detection.

Accordingly, it is desirable to provide improved systems and methods to increase a distance measurement dynamic range of a lidar system. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: receiving, by the controller, first return data detected by a first detector of a lidar device as a result of a first laser pulse or chirp; receiving, by the controller, second return data detected by a second detector of the lidar device as a result of a second laser pulse or chirp; combining, by the controller, the first return data and the second return data to form a point cloud; and controlling, by the controller, the vehicle based on the point cloud.

In various embodiments, the method includes: initiating, by a controller onboard the vehicle, the first laser pulse of chirp from the lidar device based on a first power; initiating, by the controller, the second laser pulse from the lidar device based on a second power; and wherein the first power is greater than the second power, wherein the first return data is a result of the first laser pulse or chirp, and wherein the second return data is a result of the second laser pulse or chirp.

In various embodiments, the combining the first return data and the second return data comprises combining the first return data and the second return data and determining a distance measurement based on the combining.

In various embodiments, the first laser pulse or chirp is the same laser pulse or chirp as the second laser pulse or chirp.

In various embodiments, the first detector of the lidar device and the second detector of the lidar device are adjacent to each other on the lidar device.

In various embodiments, the first detector of the lidar device and the second detector of the lidar device are spaced apart on the lidar device based on a scan rate.

In various embodiments, the first detector is configured to have a first sensitivity, wherein the second detector is configured to have a second sensitivity, wherein the first sensitivity is greater than the second sensitivity.

In various embodiments, the first return data and the second return data are associated with a same object.

In various embodiments, the first return data includes a first point measurement, and wherein the second return data includes a second point measurement.

In various embodiments, the first return data includes a first waveform, and wherein the second return data includes a second waveform.

In another embodiment, a system for controlling a vehicle includes: a first lidar device; and a controller configured to, by a processor, receive, first return data detected by a first detector of a lidar device as a result of a first laser pulse or chirp, receive second return data detected by a second detector of the lidar device as a result of a second laser pulse or chirp, combine the first return data and the second return data to form a point cloud, and control the vehicle based on the point cloud.

In various embodiments, the controller is further configured to initiate the first laser pulse of chirp from the lidar device based on a first power; initiate the second laser pulse from the lidar device based on a second power; and wherein the first power is greater than the second power, wherein the first return data is a result of the first laser pulse or chirp, and wherein the second return data is a result of the second laser pulse or chirp.

In various embodiments, the controller is configured to combine the first return data and the second return data by combining the first return data and the second return data and determining a distance measurement based on the combining.

In various embodiments, the first laser pulse or chirp is the same laser pulse or chirp as the second laser pulse or chirp.

In various embodiments, the first detector of the lidar device and the second detector of the lidar device are adjacent to each other on the lidar device.

In various embodiments, the first detector of the lidar device and the second detector of the lidar device are spaced apart on the lidar device based on a scan rate.

In various embodiments, the first detector is configured to have a first sensitivity, wherein the second detector is configured to have a second sensitivity, wherein the first sensitivity is greater than the second sensitivity.

In various embodiments, the first return data and the second return data are associated with a same object.

In various embodiments, the first return data includes a first point measurement, and wherein the second return data includes a second point measurement.

In various embodiments, the first return data includes a first waveform, and wherein the second return data includes a second waveform.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1A:
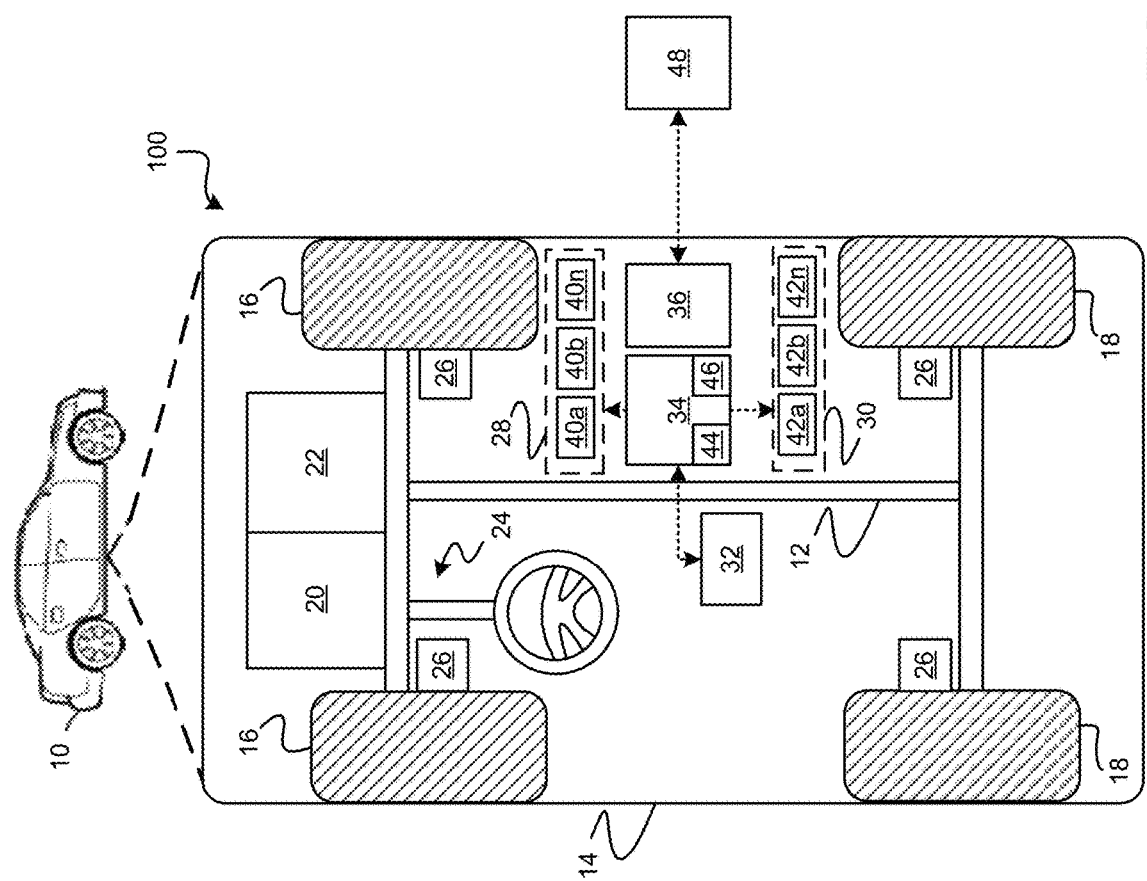
FIG. 1A is a functional block diagram illustrating an autonomous vehicle having a lidar system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In one or more exemplary embodiments described herein, a vehicle capable of autonomous operation includes a number of different devices that generate data representative of a scene or environment in a vicinity of the vehicle from different perspectives. A power of a single sensor or multiple sensors may be altered in order to improve range and/or resolution of sensor data. In addition, multiple detectors may be implemented to process the sensor returns of varying power to improve the range and/or resolution of the sensor data. In this regard, the augmented or enhanced data set may then be analyzed and utilized to determine commands for autonomously operating one or more actuators onboard the vehicle. In this manner, autonomous operation of the vehicle is influenced by the enhanced data sets.

For example, as described in greater detail below in the context of FIGS. 1-5, in exemplary embodiments, a control system shown generally at 100 is associated with a vehicle 10 in accordance with various embodiments. In general, the control system 100 selectively combines lidar return data from at least two lidar pulses or chirps, one generated at a high power and one generated at low power, in order to increase resolution and/or range of detection provided by the final data set.

As depicted in FIG. 1A, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the vehicle may be a non-autonomous vehicle and is not limited to the present examples.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

In exemplary embodiments described herein, one or more of the sensing devices 40a-40n are realized as a lidar device 40a. In this regard, the sensing devices 40a-40n may include or incorporate one or more emitters and one or more detectors. The emitters transmit light beams, which may be continuous-wave, pulsed, or modulated, into the environment of the vehicle 10; and the detectors detect reflections of the transmitted light beams off elements in the surrounding environment.

In various embodiments, the emitters and detectors are suitably configured to horizontally and rotatably scan the environment in the vicinity of the vehicle 10 via a scanning device having a particular angular frequency or rotational velocity. For example, the emitters and/or transmitters may utilize MEMS devices, rotating mirrors, micro motors, optical phased arrays (OPA), or other solid-state scanning methods to guide, transmit, emit, and collect the light waves. As used herein, a lidar scan should be understood as referring to a single revolution of a lidar device 40a and a scan rate indicates a rate at which the lidar device 40a completes the single revolution.

Figure 1B:
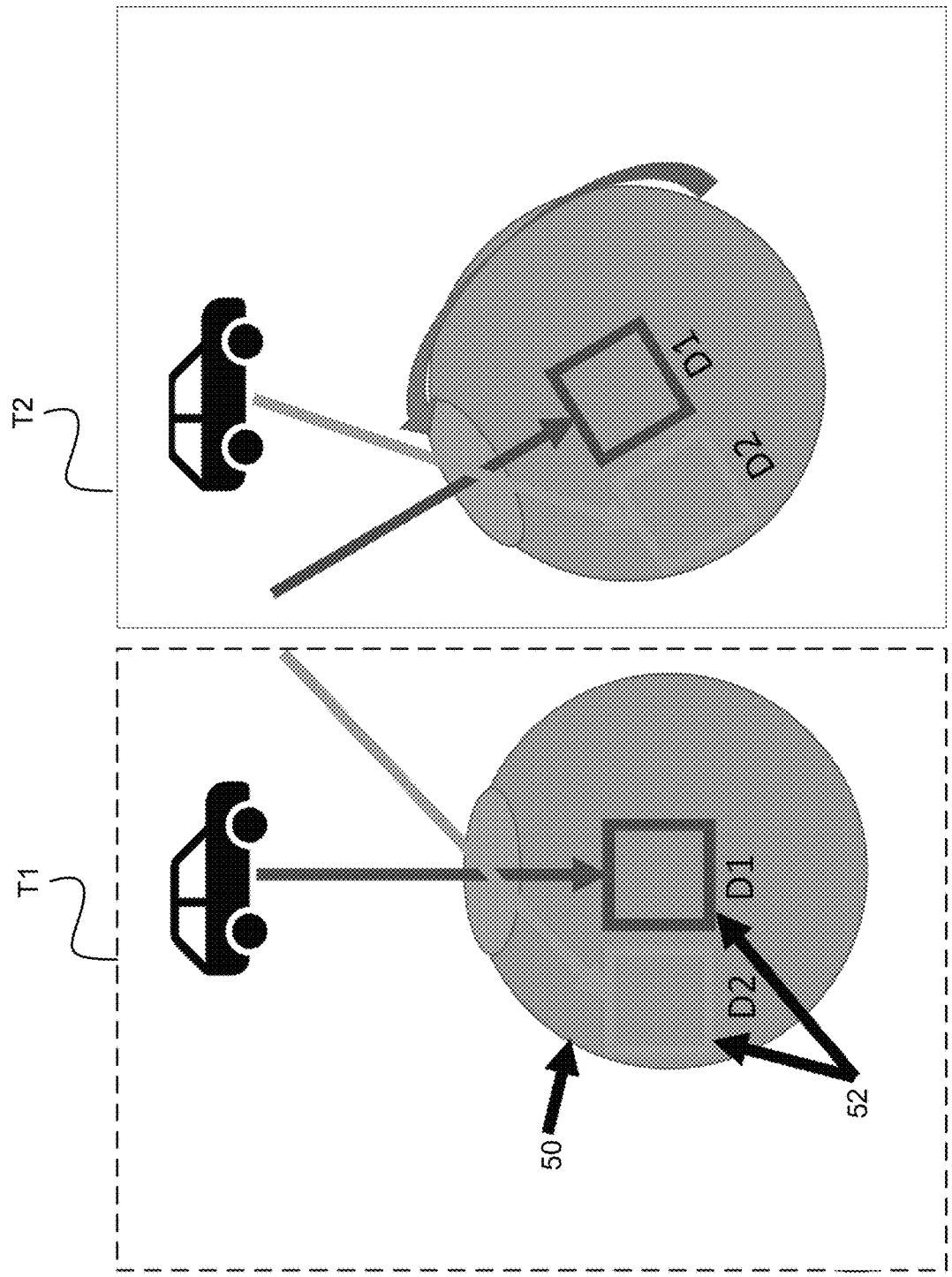
FIG. 1B is an illustration of the vehicle and the lidar system of FIG. 1A, in accordance with various embodiments.

In various embodiments, as shown in the exemplary illustration of FIG. 1B, the lidar device 40a includes at least two detectors 52 (or more) associated with a single emitter 54. The single emitter (E1) is configured to transmit light beams at varying powers or to achieve a power attenuation change from intentional misalignment of a detector. For example, the first detector (D1) is configured to receive, and process long range returns reflected from a high-power light beam (e.g., a pulse greater than 75 W at less than 5 ns width, or a continuous wave at greater than 100 mW), while the second detector (D2) is configured to receive and process short range returns reflected from a low power light beam (e.g., low power pulse at less than 10 W at 5 ns width, or a continuous wave at less than 10 mW). In another example, the of position detector (D1) can be located be at the edge of the gaussian beam profile for <1% of the energy, while 99% is in the main beam associated with first detector (D1), and such that both returns may be obtained from one pulse or chirp. With retro-reflectors 1% will provide the second detector (D2) great SNR while the first detector (D1) is saturated and provides invalid values, enabling a higher distance dynamic range on very high reflective objects (e.g., signs) and very low reflective objects (e.g., road surface) not capable with one detector.

In various embodiments, the first detector (D1) and the second detector (D2) can be of the same type of detector or can be different types of detectors including, but not limited to, PIN photodiodes (PD) (least sensitive, short range, many photons to produce 1 electron), Avalanche photo-diodes (APD) (mid-range), and single photon avalanche diode (SPAD) (most sensitive, long range, 1 photon to produce 1 electron). For example, when a high-power pulse is generated for both detectors, a pair including a SPAD and a PD can be implemented. In another example, when a high-power pulse is generated for one detector, and low power is generated through alignment or laser control, a pair including a SPAD and a SPAD can be implemented, or a pair including an APD or a PD can be implemented.

In various embodiments, the first detector (D1) and the second detector (D2) are located adjacent to one another on a scanning device 50. The first detector (D1) and the second detector (D2) can be located on a same scanning device or a different scanning device as the emitter (E1). The first detector D1 and the second detector D2 are spaced laterally apart based on the scan rate of the scanning device 50. As shown in the time steps T1, T2 of FIG. 1B, the spacing allows for the sampling of a same object in the environment at two consecutive light pulses or chirps. For example, for mechanically spinning and relying on spinning to align the detector (D2), the spacing would be related to the spinning rate and pulse/chirp rate. If the pulse rate is 100,000 Hz, and the spin rate is 10 Hz (600 rpm), the azimuth scan from pulse to pulse is 0.036 degrees (360/(100,000/10)) and the detector spacing would be equal 0.036 degrees.

With reference back to FIG. 1A, the actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

Figure 2:
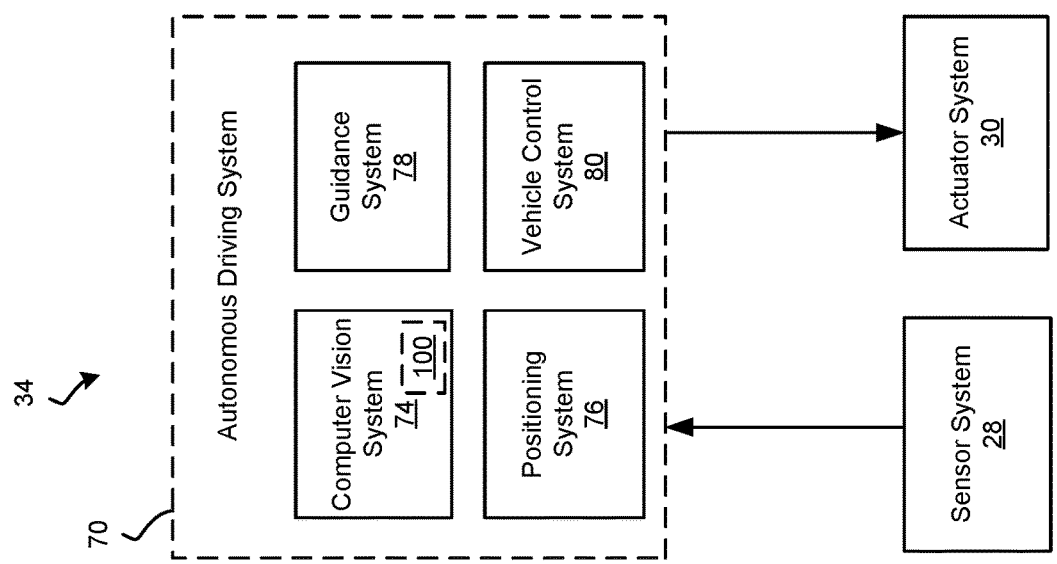
FIG. 2 is a schematic block diagram of an automated driving system (ADS) for the autonomous vehicle, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the control system 100 and, when executed by the processor 44, cause the processor 44 to perform the methods and systems described in greater detail below. In particular, the instructions, when executed by the processor, control the emitter 54 (FIG. 1B), the scanning device 50 (FIG. 1B), and/or process data from the detectors 52 (FIG. 1B) to combine low transmission power data and high transmission power data such that a single distance measurement of objects is formed for use in controlling the vehicle 10.

In accordance with various embodiments, the controller 34 implements an autonomous driving system (ADS) 70 as shown in FIG. 2. That is, suitable software and/or hardware components of the controller 34 (e.g., processor 44 and computer-readable storage device 46) are utilized to provide an autonomous driving system 70 that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. In various embodiments, the computer vision system 74 implements the control system 100 described herein.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

Figure 3:
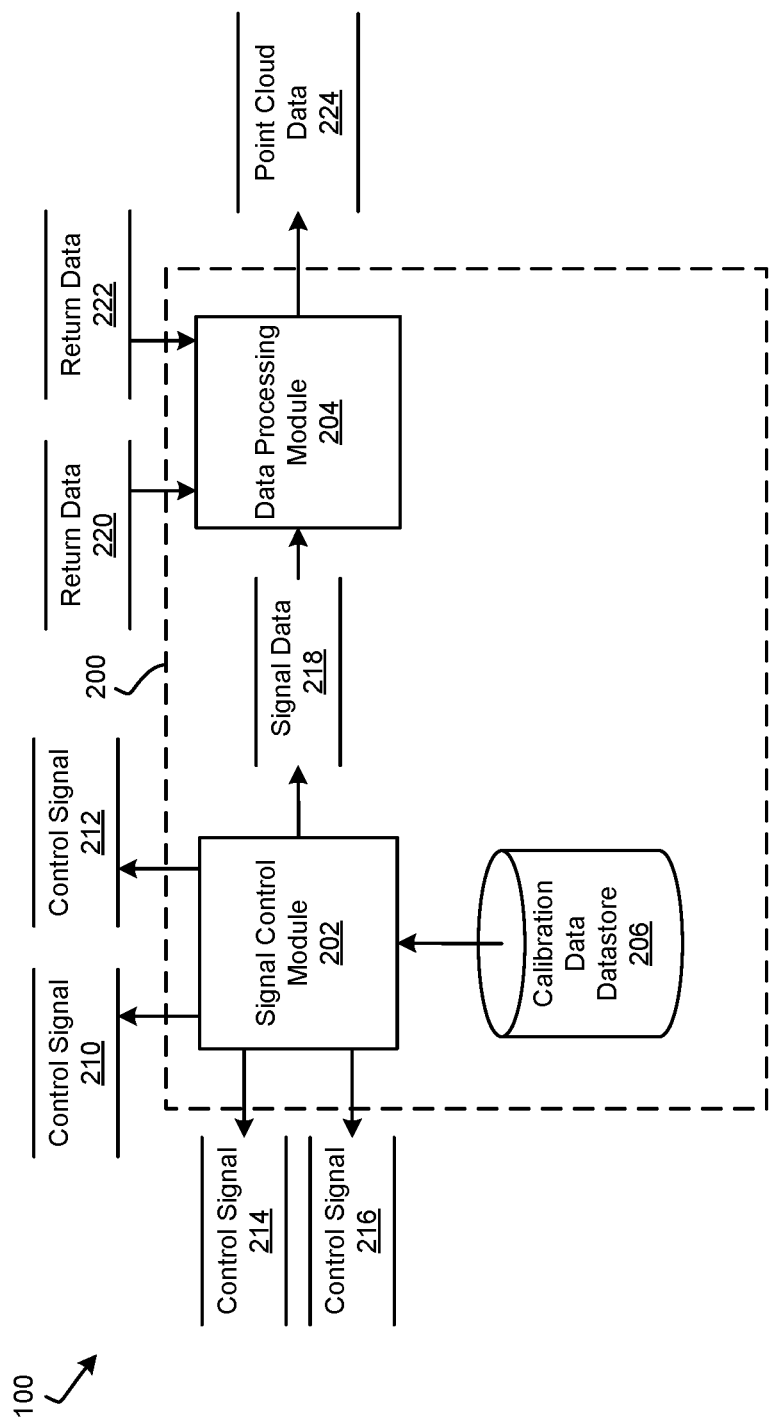
FIG. 3 is a dataflow diagram of a control module of the lidar system, in accordance with various embodiments.

With reference now to FIG. 3 and with continued reference to FIGS. 1A, 1B, and 2, FIG. 3 depicts an embodiment of a control module 200 of the control system 100 which may be implemented by or incorporated into the controller 34, the processor 44, and/or the computer vision system 74. In various embodiments, the control module 200 may be implemented as one or more sub-modules. As can be appreciated, the sub-modules shown and described may be combined and/or further partitioned in various embodiments. Data inputs to the control module 200 may be received directly from the sensing devices 40a-40n, received from other modules (not shown) of the controller 34, and/or received from other controllers (not shown). In various embodiments, the control module 200 includes a signal control module 202, a data collection module 204, and a calibration datastore 206.

In various embodiments, the signal control module 202 generates control signals 208 to control the lidar device 40a. In various embodiments, the signal control module 202 generates at least two control signals. For example, a first control signal 210 is generated to initiate a first scan by the lidar device 40a and a second control signal 212 is generated to initiate a second scan by the lidar device 40a.

The timing of the control signals 210, 212 is based on a scan rate. As discussed above, the scan rate is based on a position of the first detector (D1) relative to the second detector (D2). For example, the scan rate is set such that a same object may be sampled by two consecutive pulses. In various embodiments, the signal control module 202 determines the scan rate based on calibration information stored in the calibration datastore 206.

In various embodiments, the signal control module 202 generates the control signals 210, 212 based on a desired power. For example, a first control signal 214 is generated to control the pulse by the lidar device 40a based on a first high power (e.g., a power within a first range) and a second control signal 216 is generated to control the pulse by the lidar based on a second low power (e.g. a power within a second range) or based on the first high power (e.g., based on the implementation and spacing of the detectors). The first control signal 214 corresponds to the first control signal 210 and the second control signal 216 corresponds to the second control signal 212 such that return signals from the first scan are observed by the first detector D1 (optimized for long range performance) and return signals from the second scan are observed by the second detector D2 (optimized for short range performance). In various embodiments, the signal control module 202 determines the power (e.g., low or high) based on calibration information stored in the calibration datastore 206.

In various embodiments, the signal control module generates control data 218 indicating position, timing, and signal values related to the control signals 210, 212.

The data processing module 204 receives the control data 218, and lidar return data 220 as a result of the first signals and the lidar return data 222 as a result of the second signals and generates point cloud data 224 based thereon. In various embodiments, the data processing module 204 generates the point cloud data 224 by combining each point and/or waveform of the lidar return data 220, 222, thus improving range and resolution.

Figure 4:
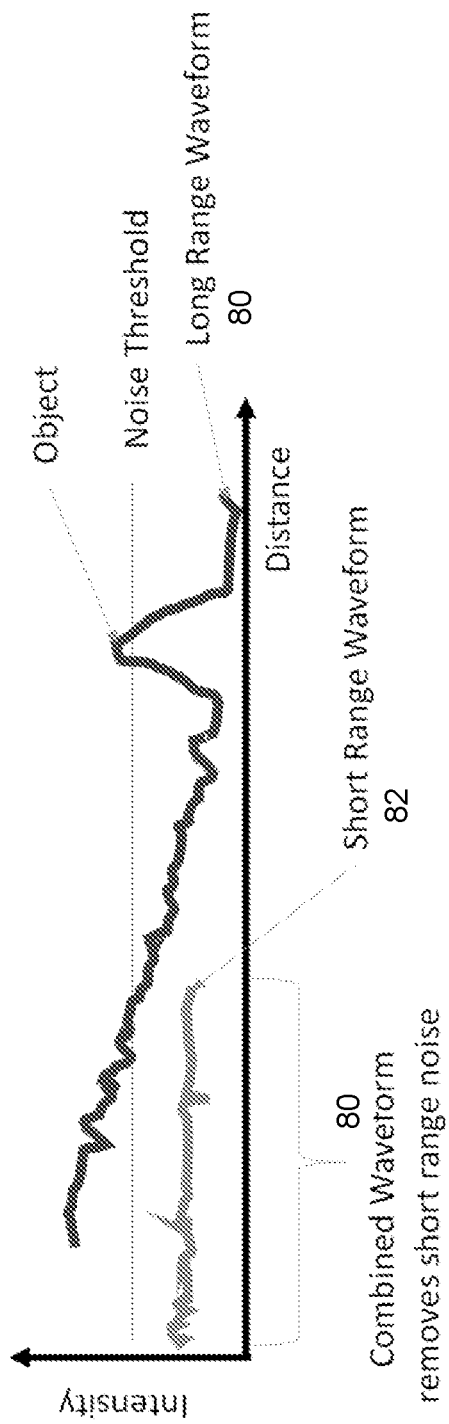
FIG. 4 is a graph illustrating lidar return data in, accordance with various embodiments.

For example, as shown in FIG. 4, the graph illustrates distance along the x-axis and intensity along the y-axis. A long-range waveform 80 and a short-range waveform 82 are combined to form a combined waveform 84 for the short-range distance. This combined waveform removes short-range noise of the long-range waveform. The combined waveform is used to generate the point cloud data 224. The point cloud data 224 may then be used by other systems for further analysis and to control the vehicle 10.

Figure 5:
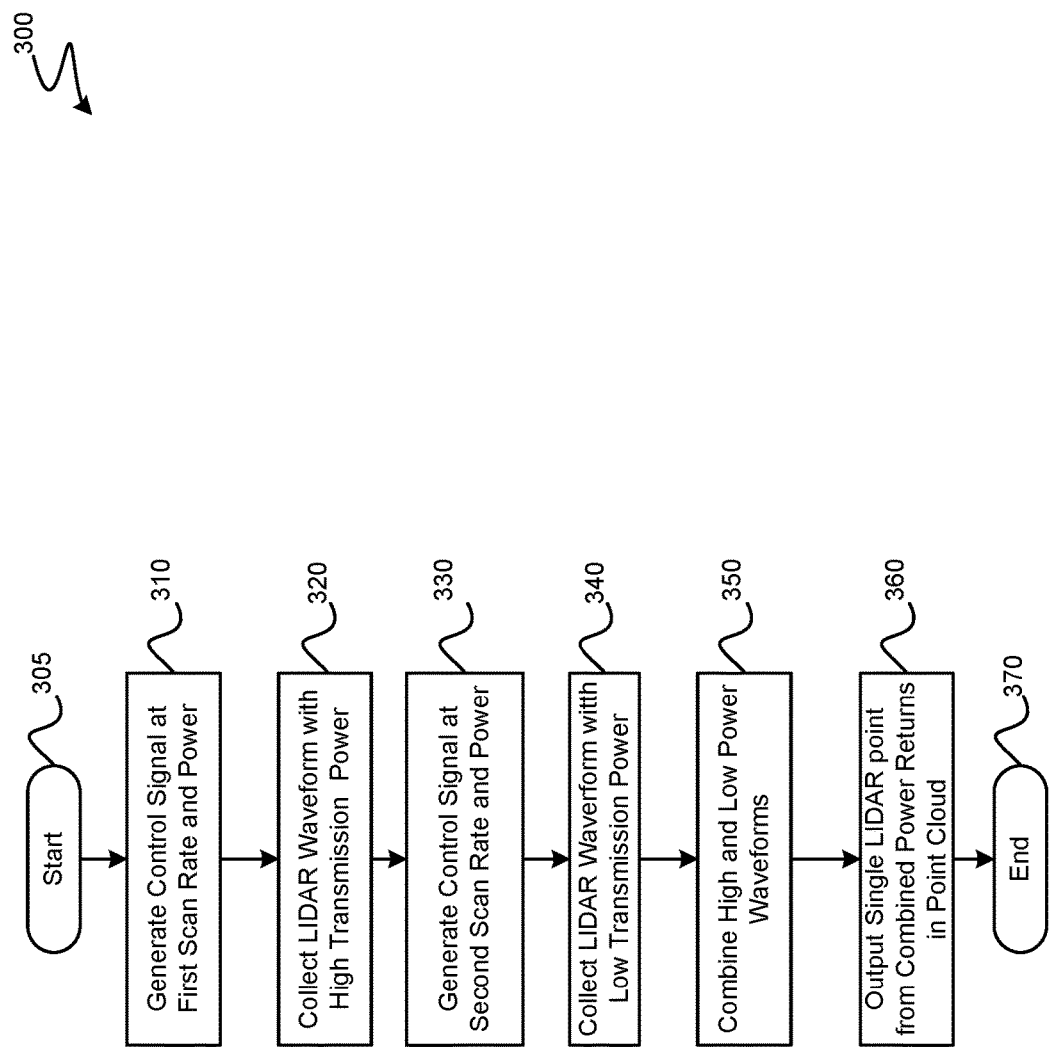
FIG. 5 is a flowchart illustrating a lidar control method, in accordance with various embodiments.

Referring now to FIG. 5, and with continued reference to FIGS. 1-4 a flowchart illustrates various embodiments of a process 300 which may be embedded within a controller 34 in the control system 100 of FIG. 1 supporting the ADS 70 and the control module 200 of FIG. 3 in accordance with the present disclosure. As can be appreciated in light of the disclosure, the order of operation within the method is not limited to the sequential execution as illustrated in FIG. 5 but may be performed in one or more varying orders as applicable and in accordance with the present disclosure. In various embodiments, the process 300 can be scheduled to run based on one or more predetermined events, and/or can run continuously during operation of the vehicle 10.

In one example, the method may begin at 305. The control signal 210 is generated to control the lidar device 40a according to a first scan rate and power at 310. The lidar waveform with high transmission power is collected by the first detector D1 having the alignment and optimized for long range performance at 320. Optionally, the control signal 212 is generated to control the lidar device 40a according to a second scan rate and power at 330 (e.g. when a low power pulse or chip is implemented), The lidar waveform with low transmission power is collected by the second detector D2 having the alignment optimized for short range performance at 340.

Thereafter, the high-power long-range waveform and the low power short-range waveform are combined into a single lidar point, for example, as discussed above with regard to FIG. 4, at 350. The single lidar point is assembled into a lidar point cloud at 360 for use in controlling the vehicle 10. Thereafter, the method may end at 370.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:

initiating, by a controller onboard the vehicle, a first laser pulse or chirp from a lidar device based on a first power;

initiating, by the controller, a second laser pulse or chirp from the lidar device based on a second power, wherein the first power is greater than the second power, a first return data is a result of the first laser pulse or chirp, and a second return data is a result of the second laser pulse or chirp;

receiving, by the controller, the first return data detected by a first detector of the lidar device as the result of the first laser pulse or chirp associated with a first distance range;

receiving, by the controller, the second return data detected by a second detector of the lidar device as the result of the second laser pulse or chirp associated with a second distance range, wherein the first distance range is greater than the second distance range;

removing short range noise from a long range waveform of the first return data by combining, by the controller, the long range waveform of the first return data and a short range waveform of the second return data to generate a combined waveform;

forming a point cloud including a three-dimensional cloud of points based on the combined waveform; and controlling, by the controller, the vehicle based on the point cloud, wherein the lidar device is configured to horizontally and rotatably scan an environment in a vicinity of the vehicle in accordance with a first angular velocity at a first scan rate to complete a first revolution and the first and second detectors are spaced laterally apart based on the first scan rate, wherein the first detector is configured to process the first return data associated with the first distance range and the first return data is reflected from the first laser pulse or chirp based on the first power that is greater than 75 W and less than a 5 ns width, and wherein the second detector is configured to process the second return data associated with the second distance range and the second return data is reflected from the second laser pulse or chirp based on the second power that is less than 10 W at a 5 ns width.

2. The method of claim 1, further comprising determining a distance measurement based on the combined waveform.

3. The method of claim 1, wherein the first laser pulse or chirp is the same laser pulse or chirp as the second laser pulse or chirp.

4. The method of claim 1, wherein the first detector of the lidar device and the second detector of the lidar device are adjacent to each other on the lidar device.

5. The method of claim 1, wherein the first detector is configured to have a first sensitivity, wherein the second detector is configured to have a second sensitivity, wherein the first sensitivity is greater than the second sensitivity.

6. The method of claim 1, wherein the first return data and the second return data are associated with a same object.

7. The method of claim 1, wherein the first return data includes a first point measurement, and wherein the second return data includes a second point measurement.

8. The method of claim 1, wherein the first return data and the second return data are a result of the first laser pulse or chirp and the second laser pulse or chirp, respectively, the first laser pulse or chirp and the second laser pulse or chirp being consecutive laser pulses or chirps.

9. A system for controlling a vehicle, comprising:
a lidar device; and a controller configured to, by a processor, to:
- initiate a first laser pulse or chirp from the lidar device based on a first power;
- initiate a second laser pulse or chirp from the lidar device based on a second power, wherein the first power is greater than the second power, a first return data is a result of the first laser pulse or chirp, and a second return data is a result of the second laser pulse or chirp;
- receive, the first return data detected by a first detector of the lidar device as the result of the first laser pulse or chirp associated with a first distance range;
- receive the second return data detected by a second detector of the lidar device as the result of the second laser pulse or chirp associated with a second distance range, wherein the first distance range is greater than the second distance range;
- remove short range noise from a long range waveform of the first return data by combining the long range waveform of the first return data and a short range waveform of the second return data to generate a combined waveform;
- form a point cloud including a three-dimensional cloud of points based on the combined waveform; and
- control the vehicle based on the point cloud,
- wherein the lidar device is configured to horizontally and rotatably scan an environment in a vicinity of the vehicle in accordance with a first angular velocity at a first scan rate to complete a first revolution and the first and second detectors are spaced laterally apart based on the first scan rate,
- wherein the first detector is configured to process the first return data associated with the first distance range and the first return data is reflected from the first laser pulse or chirp based on the first power that is greater than 75 W and less than a 5 ns width, and
- wherein the second detector is configured to process the second return data associated with the second distance range and the second return data is reflected from the second laser pulse or chirp based on the second power that is less than 10 W at a 5 ns width.

10. The system of claim 9, wherein the controller is configured to determine a distance measurement based on the combined waveform.

11. The system of claim 9, wherein the first laser pulse or chirp is the same laser pulse or chirp as the second laser pulse or chirp.

12. The system of claim 9, wherein the first detector of the lidar device and the second detector of the lidar device are adjacent to each other on the lidar device.

13. The system of claim 9, wherein the first detector is configured to have a first sensitivity, wherein the second detector is configured to have a second sensitivity, wherein the first sensitivity is greater than the second sensitivity.

14. The system of claim 9, wherein the first return data and the second return data are associated with a same object.

15. The system of claim 9, wherein the first return data includes a first point measurement, and wherein the second return data includes a second point measurement.

16. The system of claim 9, wherein the first return data and the second return data are a result of the first laser pulse or chirp and the second laser pulse or chirp, respectively, the first laser pulse or chirp and the second laser pulse or chirp being consecutive laser pulses or chirps.

17. The method of claim 1, wherein a pulse rate of the first laser pulse and the second laser pulse is 100,000 Hz and the first scan rate is 10 Hz, an azimuth scan between consecutive first and second laser pulses is 0.036 degrees and a detector spacing associated with the first and second detectors is 0.036 degrees.

18. The system of claim 9, wherein a pulse rate of the first laser pulse and the second laser pulse is 100,000 Hz and the first scan rate is 10 Hz, an azimuth scan between consecutive first and second laser pulses is 0.036 degrees and a detector spacing associated with the first and second detectors is 0.036 degrees.

* * * * *